(12) United States Patent
Watts et al.

(10) Patent No.: US 11,932,053 B2
(45) Date of Patent: Mar. 19, 2024

(54) DECORATIVE APPLIQUE WITH POLYMERIC OVER COATING AND METHOD OF APPLYING SAME

(71) Applicant: SUPERIOR INDUSTRIES INTERNATIONAL, INC., Southfield, MI (US)

(72) Inventors: Christopher Allen Watts, Milford, MI (US); Henry Clay Chenault, III, Fayetteville, AR (US)

(73) Assignee: SUPERIOR INDUSTRIES INTERNATIONAL INC., Southfield, MI (US)

( * ) Notice: Subject to any disclaimer, the term of this patent is extended or adjusted under 35 U.S.C. 154(b) by 143 days.

(21) Appl. No.: 17/510,595

(22) Filed: Oct. 26, 2021

(65) Prior Publication Data

US 2022/0041008 A1 Feb. 10, 2022

Related U.S. Application Data

(63) Continuation-in-part of application No. PCT/US2020/048197, filed on Aug. 27, 2020.
(Continued)

(51) Int. Cl.
*B60B 7/00* (2006.01)
*B05D 7/00* (2006.01)
(Continued)

(52) U.S. Cl.
CPC .............. *B60B 7/0066* (2013.01); *B05D 7/57* (2013.01); *B60B 1/06* (2013.01); *B60B 7/0046* (2013.01);
(Continued)

(58) Field of Classification Search
CPC ....... B60B 1/06; B60B 7/0066; B60B 7/0046; B60B 7/061; B60B 7/065;
(Continued)

(56) References Cited

U.S. PATENT DOCUMENTS 5,441,334 A * 8/1995 Botterman ................ B60B 7/00
301/37.26
5,458,401 A * 10/1995 Baccman .................. B60B 7/00
301/37.11
(Continued)

FOREIGN PATENT DOCUMENTS

DE 2935584 A1 3/1981
FR 3071772 A1 * 4/2019
(Continued)

OTHER PUBLICATIONS

Machine Translation of FR 3071772 A1, 4 pages (Year: 2019).*
(Continued)

*Primary Examiner* — S. Joseph Morano
*Assistant Examiner* — Emily G. Castonguay
(74) *Attorney, Agent, or Firm* — Gregory D. DeGrazia; Miller, Canfield, Paddock and Stone

(57) ABSTRACT

A vehicle wheel is defined by a substrate including a face and a rim portion. The face defines a plurality of spokes extending radially outwardly between a central portion of the face and the rim portion and defining a mating portion. An applique is affixed to the wheel at the mating portion. A polymer over-coating that is substantially transparent extends over the applique and the wheel substrate defining a continuous polymer surface over the applique and the wheel substrate.

28 Claims, 11 Drawing Sheets

Related U.S. Application Data

(60) Provisional application No. 63/107,152, filed on Oct. 29, 2020, provisional application No. 62/892,208, filed on Aug. 27, 2019.

(51) Int. Cl.
  *B32B 7/12* (2006.01)
  *B60B 1/06* (2006.01)
  *B60B 7/06* (2006.01)

(52) U.S. Cl.
  CPC ............... *B60B 7/061* (2013.01); *B32B 7/12* (2013.01); *B60B 2310/318* (2013.01); *B60B 2310/616* (2013.01); *B60B 2360/32* (2013.01); *B60B 2900/572* (2013.01)

(58) Field of Classification Search
  CPC ........ B60B 2310/318; B60B 2310/616; B60B 2360/32; B60B 2900/572; B05D 7/57; B32B 7/12
  See application file for complete search history.

(56) References Cited

U.S. PATENT DOCUMENTS

| | | | |
|---|---|---|---|
| 6,443,531 | B1 | 9/2002 | Hogan et al. |
| 9,327,445 | B1* | 5/2016 | Boone .................. G09F 21/045 |
| 2004/0124693 | A1 | 7/2004 | Fitzgerald |
| 2007/0018496 | A1* | 1/2007 | McCorquodale ......... B60B 7/04 |
| | | | 301/37.11 |
| 2008/0111419 | A1* | 5/2008 | Stahel .................... B60B 7/006 |
| | | | 301/37.41 |
| 2011/0291465 | A1* | 12/2011 | Peschiutta ................ B60B 7/18 |
| | | | 301/37.102 |
| 2012/0019047 | A1* | 1/2012 | Niedermayer ............ B60B 3/02 |
| | | | 301/5.1 |
| 2012/0101612 | A1* | 4/2012 | Thompson ....... G05B 19/40935 |
| | | | 700/97 |
| 2012/0135208 | A1 | 5/2012 | Hillereau |
| 2013/0076105 | A1 | 3/2013 | Hung |
| 2015/0239286 | A1 | 8/2015 | Boswell-Horstmeyer |
| 2015/0284836 | A1* | 10/2015 | Liu ...................... C25D 11/246 |
| | | | 204/192.15 |
| 2015/0353773 | A1* | 12/2015 | Dornseif ................. C23C 22/74 |
| | | | 204/192.15 |
| 2016/0001591 | A1* | 1/2016 | Inatani ..................... B05D 5/06 |
| | | | 427/256 |
| 2017/0129279 | A1 | 5/2017 | Stebbins et al. |
| 2018/0056714 | A1* | 3/2018 | Maji ......................... B60B 7/06 |
| 2020/0180356 | A1 | 6/2020 | Van Houten |

FOREIGN PATENT DOCUMENTS

| | | |
|---|---|---|
| WO | 2019/115487 A1 | 6/2019 |
| WO | 2021/041674 A1 | 3/2021 |

OTHER PUBLICATIONS

Written Opinion and International Search Report issued by the International Searching Authority fo rPCT Application PCT/US2019/065711, dated Nov. 9, 2020.

Extended European Search Report for European Application No. 21205311.0 dated Mar. 30, 2022.

\* cited by examiner

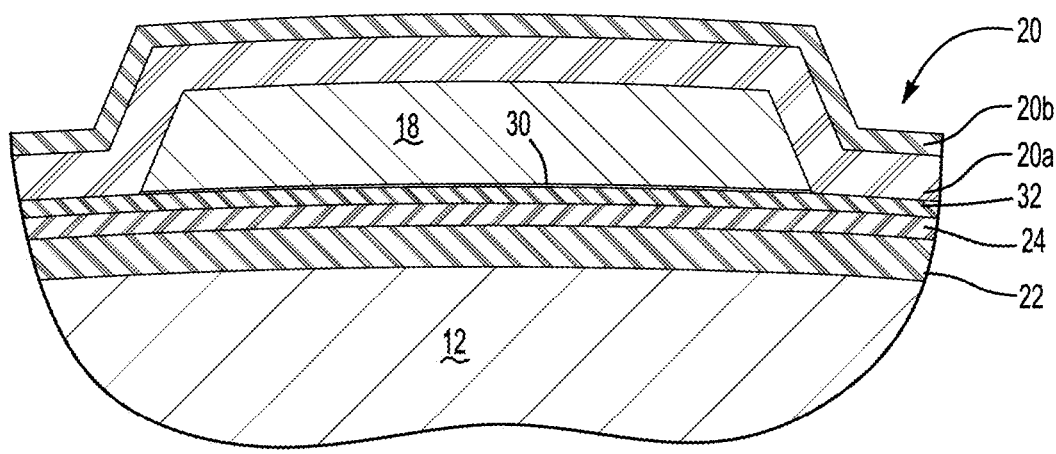
_Fig-6A_
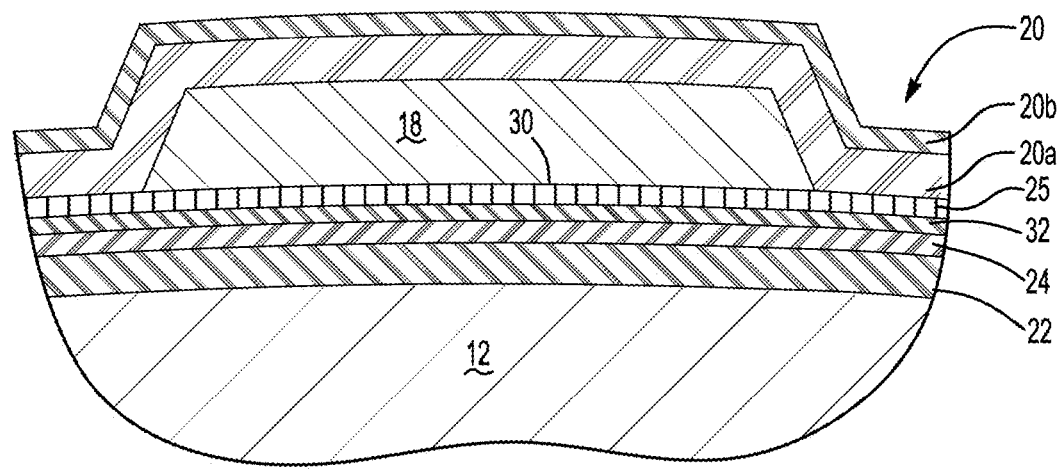
_Fig-6B_

DECORATIVE APPLIQUE WITH POLYMERIC OVER COATING AND METHOD OF APPLYING SAME

PRIOR APPLICATIONS

The present application claims priority to U.S. Provisional Patent Application No. 63/107,152 filed on Oct. 29, 2020 and as a Continuation-In-Part of International Patent Application No. PCT/US2020/048197 filed on Aug. 27, 2020 that claims priority to U.S. Provisional Patent Application No. 62/892,208 filed on Aug. 27, 2019, the contents each of which are included herein by reference.

TECHNICAL FIELD

The present invention relates generally toward application of decorative features to a vehicle component. More specifically, the present invention relates toward a vehicle wheel with a decorative applique and a method of manufacturing same.

BACKGROUND

Ever increasing consumer desires with regard to customized passenger vehicles have caused vehicle manufacturers and their suppliers to identify unique distinguishing features. Vehicle wheels have not been exempted from these consumer desires. In addition, it is becoming increasingly desirable to include unique brand identifiers on, for example, vehicle wheels. Therefore, wheel manufacturers have been seeking different manufacturing techniques that provide distinguishing features including machining unique features into the wheel alloy, unique coating technologies and the addition of metallic layers.

Unique performance requirements of vehicle wheels have prevented additional distinguishing features, such as adhering appliques, in the form of brand identifiers and the like. Application of these items has not been attempted due to durability deficiencies when subject the rigors of, for example, dirt and gravel roads, road salt, and other environmental contaminants. However, there is a market desire to include distinguishing features on vehicle wheels that, to date, could only be provided by way of an applique. Therefore, there is a significant need to develop a process and technique for applying distinguishing features to a wheel that would enable application of unique brand identifiers to a wheel while still providing necessary durability and performance.

SUMMARY

A vehicle wheel is defined by a wheel substrate including a face and a rim portion. The face defines a plurality of spokes extending radially outwardly between a central portion defined by the face and the rim portion. An applique including a decorative feature that is distinguishable from the wheel is affixed to a mating portion of the wheel. A polymer over-coating is applied over the applique and the wheel that is substantially transparent covering the applique and the wheel defining a continuous polymer surface over the applique and the wheel substrate.

Significant efforts have been expended to develop polymeric coatings for wheels that are capable of withstanding environmental rigors of a wide range of road surfaces and other environmental factors. However, appliques and labels have not been capable of providing requisite durability when applied over these coatings. This problem is overcome by the invention of the present application. The inventive process of applying durable polymer coatings over the applique and the wheel after the applique has been adhered to a wheel provides the benefit of providing performance characteristics of the polymer coating while protecting the applique from known environmental contaminants. In addition, unique tinting, coloring and pigmenting techniques applied to the polymeric over-coating can provide additional unique appearance characteristics. For example, presenting a continuous polymer surface offers aesthetic characteristics previously not available to vehicle wheels. The continuous polymeric over-coating presents a same gloss level over both the applique and the wheel surface giving the appearance of the applique being part of the wheel substrate.

BRIEF DESCRIPTION OF THE DRAWINGS

Other advantages of the present invention will be readily appreciated, as the same becomes better understood by reference to the following detailed description when considered in connection with the accompanying drawings, wherein:

FIG. 6A shows a cross-section of a fifth embodiment of a wheel of the present invention;

FIG. 6B shows a cross-section of the fifth embodiment of the wheel of the present invention with the decorative applique adhered to the second intermediate polymeric coating;

DETAILED DESCRIPTION

Figure 1:
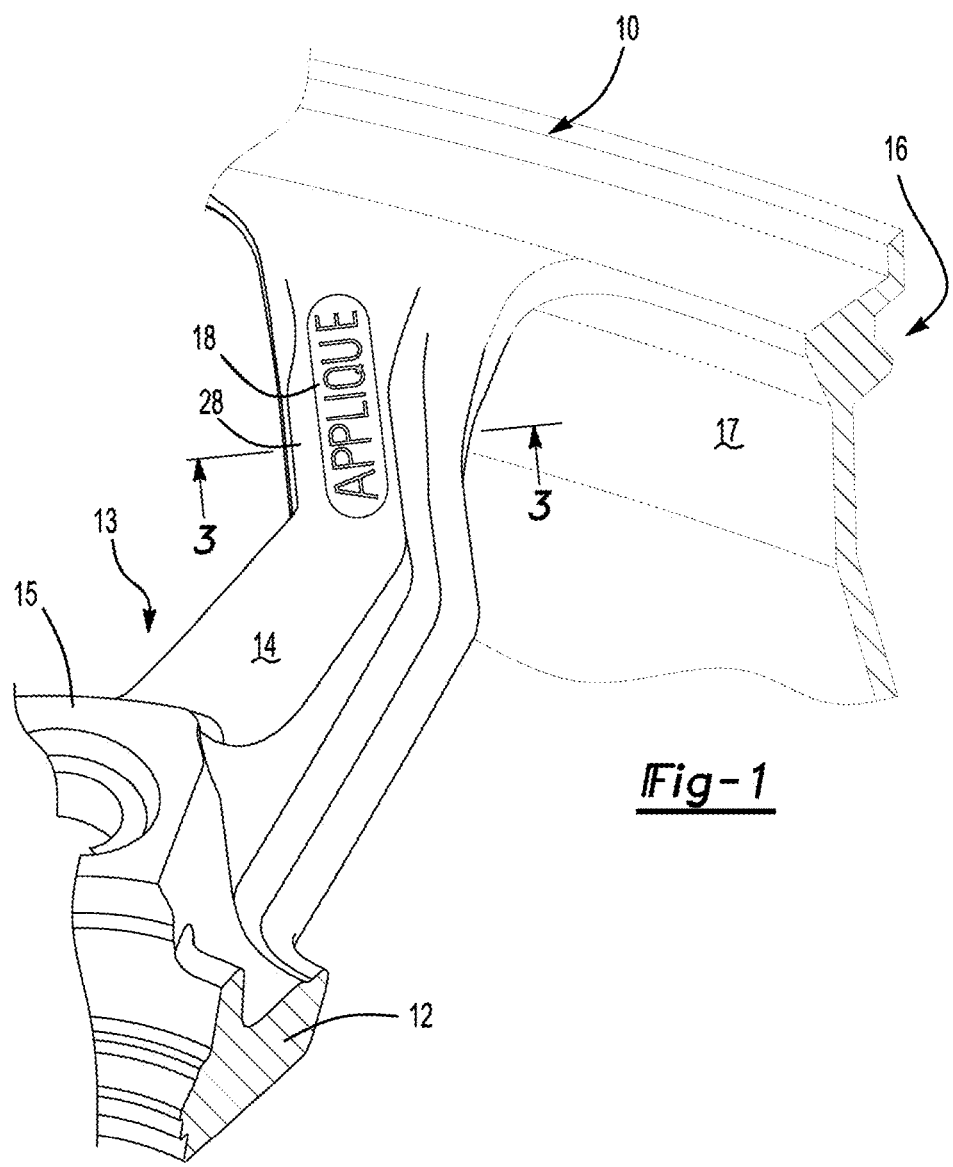
FIG. 1 shows a partial perspective view of a wheel including a decorative applique.

Referring to FIG. 1, a partial perspective view of a wheel of the present invention is generally shown at 10. The wheel 10 includes a formed wheel substrate 12 defining a face 13 and a rim portion 16. Spokes 14 extend between a central portion 15 of the face 13 and a bead 17 defined by the rim portion 16 that defines a periphery of the wheel 10. A decorative applique 18 is adhered to one of the spokes 14 presenting, in this embodiment, the brand identifier shown "APPLIQUE". It should be understood that the brand identifier shown in FIG. 1 is merely exemplary and may be replaced by alternative identifiers or slogans, including but not limited to third party brands, wheel brands, customer brands, etc. In addition, the applique 18 may present a texture or patterns to the wheel that previously required complex tooling or machining to form into substrate 12 as will be explained further herein below.

By way of example, the applique 18 is contemplated to take many forms. In one embodiment, the applique 18 is a two-dimensional decal presenting brand names, patterns, slogans, and any number of alternatives and combinations. In an alternative embodiment, the applique 18 is a three-dimensional component that is painted, coated, chromed, or decorated in any manner that may be complementary to the wheel 10 or message being conveyed. The applique 18 is contemplated to include lettering or graphical features extending upwardly from a base for providing additional distinguishing characteristics. Additionally, the applique 18 is contemplated to include coloring that blends with a wheel 10 color or coloring that contrasts with the wheel 10 coloring. Additional distinguishing features are exhibited when the applique 18 is affixed to the wheel substrate 12 that presents an alloy background appearance to the applique 18 that will also be explained further hereinbelow.

Figure 2A:
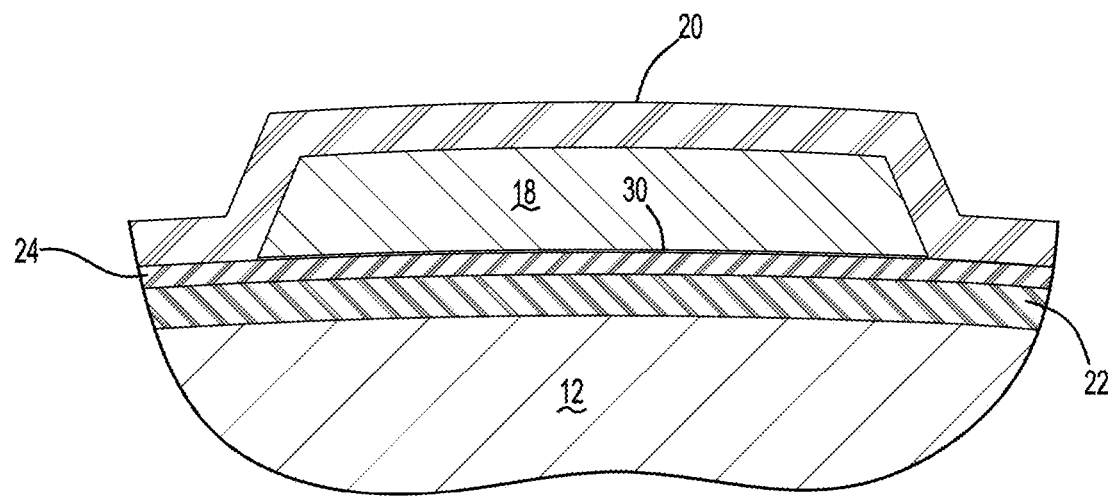
FIG. 2A shows a cross-section of a first embodiment of a wheel of the present invention.
Figure 2B:
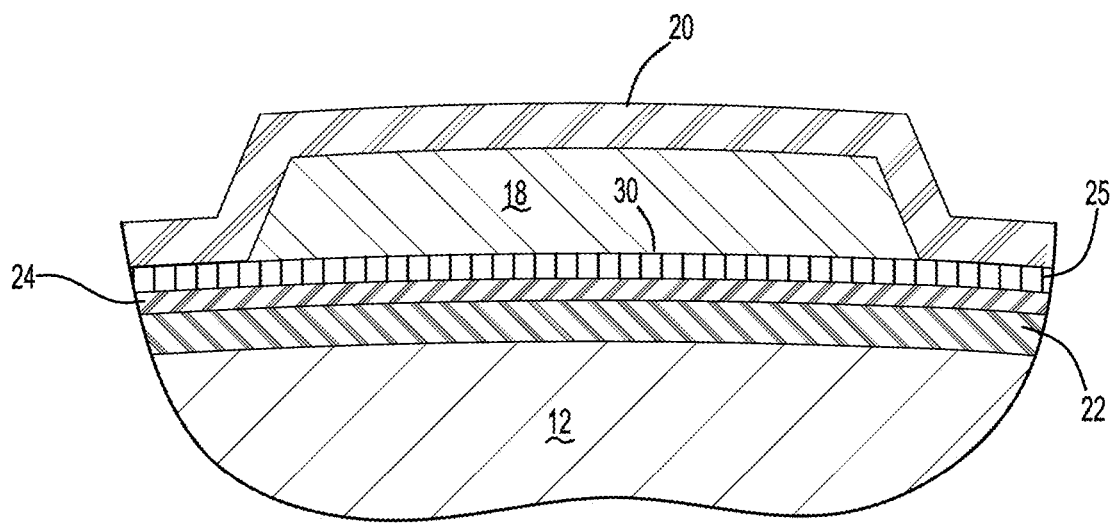
FIG. 2B shows a cross-section of the first embodiment of the wheel of the present invention with the decorative applique adhered to a second intermediate polymeric coating.

Referring now to FIGS. 2A and 2B, a first embodiment shows the applique 18 affixed to the wheel 10. A polymeric over-coating 20 is applied over the wheel 10 and the applique 18 presenting a continuous polymeric surface extending over both the wheel 10 and the applique 18 as disclosed hereinabove. The polymeric over-coating 20 in one embodiment is a clear coating presenting a consistent or same gloss level to the applique 18 and the wheel 10. In an alternative embodiment, the polymeric over-coating 20 is lightly pigmented or tinted uniformly providing depth or modified appearance to the wheel 10 and the applique 18. In a still further alternative embodiment, the polymeric over-coating 20 includes opalescent pigmentation providing an even further color shifting aesthetic enhancement to the applique 18. Further, the polymeric over-coating includes any of a powder coating, a urethane, or any polymeric coating capable of providing desirable durability to the applique 18 (and the wheel 10). The applique 18 is heat resistant to at least the temperature required to cure the polymeric over-coating 20 in an industrial paint bake oven. The polymeric over-coating 20 includes ultraviolet absorbers to deter breakdown of the polymer chains and provide further durability to the applique 18 by preventing ultraviolet degradation.

It should be understood that alternative coating and curing techniques may be used to apply the clear coat or polymeric over-coat 20 over the applique 18. As set forth above, in one embodiment, the polymeric over-coat 20 is a powder coating. Alternatively, the polymeric over-coat 20 can be a one or two component urethane. After applying the polymeric over-coat 20 over the applique 18 and wheel 10, the wheel 10 is subject to a curing step in a bake oven or the like. Therefore, the applique 18 is capable of withstanding curing temperatures of the polymeric over-coat 20 that could exceed 280° F. Alternatively, the curing temperature of the polymeric over-coat 20 is adjusted to accommodate lower thermal limits of the applique 18.

A primer or base polymeric coating 22 is applied to the wheel 10 prior to adhering the applique 18 to the wheel 10. The base polymeric coating 22 provides durability to the wheel 10 by improving adhesion of the polymeric over-coatings 20 and inhibiting corrosion. A first intermediate polymeric coating 24 providing a pigmented base color is applied over the primer or base polymeric coating 22. Therefore, in this embodiment, as shown in FIG. 2A, the applique 18 is adhered to the first intermediate polymeric coating 24. Alternatively, as shown in FIG. 2B, a protective or second intermediate polymeric coating 25 may be applied over the first intermediate polymeric coating 24 prior to adhering the applique 18 to the wheel 10. The second intermediate polymeric coating 25 protects the first intermediate polymeric coating 24, provides additional durability to the wheel 10, and optimizes adhesion of the applique 18 to the wheel 10. The second intermediate polymeric coating 25 may be a clear, transparent coating or may include differing levels of pigmentation, dye, or tint to achieve desired aesthetics. It should also be understood that the second intermediate polymeric coating 25 may cover the entire first intermediate polymeric coating 24 or only portions of the first intermediate polymeric coating 24, such as an area under the applique 18, without varying the scope of the invention.

The second intermediate polymeric coating, in one embodiment, provides enhanced adhesion properties to the adhesive 30 used to bond the applique 18 to the wheel 10. It is further contemplated that the second intermediate polymeric coating 25, while clear or substantially clear provides less gloss than the upper coatings that cover the applique. In a still further embodiment, the polymers used in the second intermediate polymeric coating 25 is not fully cured or cross-linked prior to adhering the applique 18 to the second intermediate polymeric coating 25 by way of the adhesive 30 to facilitate adhesions and cross-linking between the adhesive 30 and the second intermediate polymeric coating.

In a still further embodiment, the second intermediate polymeric coating 25 is subject to activation by way of atmospheric plasma treatment at least at the location the applique 18 is affixed as is disclosed in co-pending U.S. patent application Ser. Nos. 15/524,075 and 16/256,550 the contents each of which are incorporated herein by reference. Therefore, the energy level of the polymers comprising the second intermediate polymeric coating 25 can be raised and lowered to improve adhesion with the adhesive 30.

In a further alternative embodiment, the polymeric over-coat 20 may be cured by way of exposure to infrared (IR) light to accommodate lower thermal limits of the applique 18. IR curing techniques are sometimes used for "spot repairs" in automotive assembly plants. However, regular production IR curing has not previously been used for automotive components, such as, for example, vehicle wheels. ER curing provides the potential to apply the polymeric over-coat 20 over the entire wheel surface, or only locally over the applique 18 while "feathering" the IR cured coating into previously applied and cured over-coat 20 or the first or second intermediate polymeric coating 24, 25 onto which the applique 18 is placed.

Figure 11:
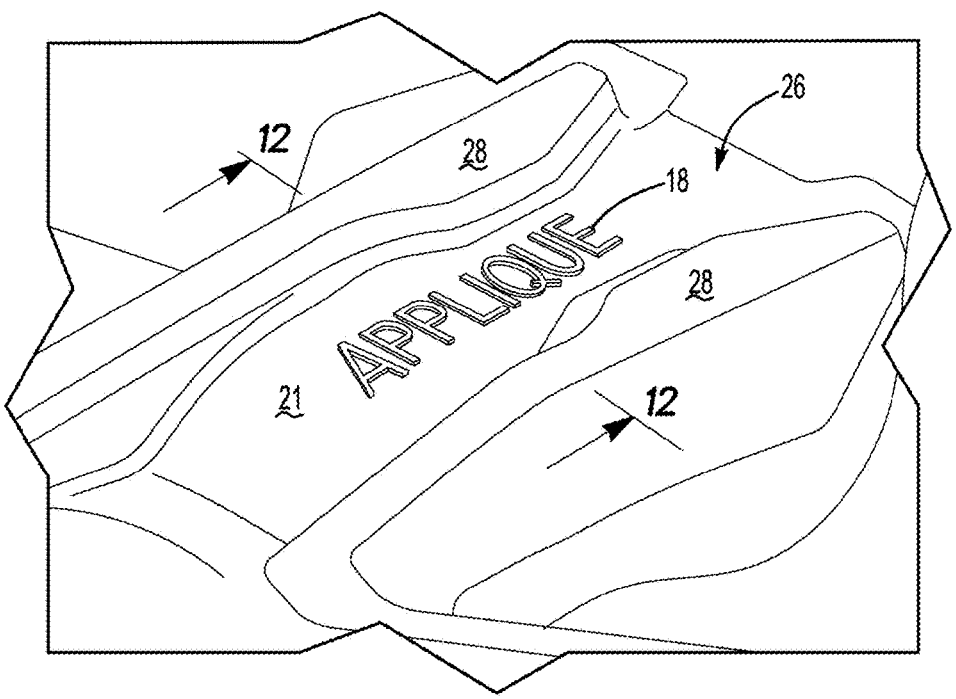
FIG. 11 shows a partial perspective view of an applique disposed in a recessed portion of a face of the wheel.
Figure 12:
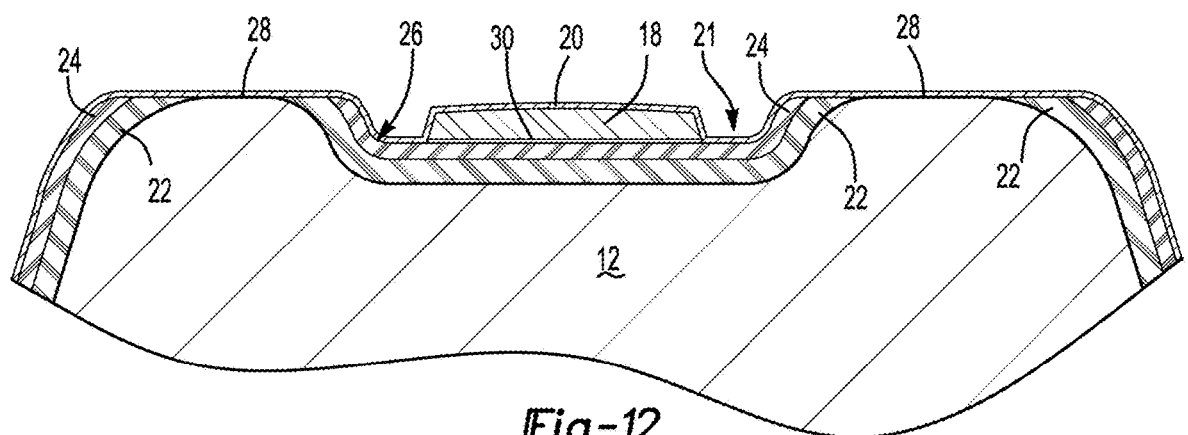
FIG. 12 shows a cross-section through line 12-12 of FIG. 11.

In a further embodiment, the wheel 10 may require additional cleaning and conversion after the applique 18 has been applied. In one embodiment, the applique 18 is applied to a mating portion 21 on a recessed surface 26 (as shown in FIG. 11) that is spaced below an upper surface 28. The upper surface 28 is subsequently turned, machined, or milled to expose or reconfigure the face 13. In this embodiment, after turning, machining, or milling, the wheel 10 is subsequently cleaned and provided a conversion coating in a known manner. Alternatively, the wheel 10 may be subject to a localized dry plasma conversion as disclosed in co-pending U.S. patent application Ser. Nos. 15/524,075 and 16/256,550, the contents of which are incorporated herein by reference. In either embodiment, the applique 18 is configured to withstand the additional processing without discernable degradation of appearance. It is contemplated by the inventors that subjecting the applique 18 to a conversion coating will also enhance adhesion of the polymeric over-coating 20 to the applique 18. Following cleaning and conversion, the polymeric over-coating 20 or equivalent is applied over the applique 18 as is described herein.

The applique 18 in one embodiment is a decal that is adhered to the wheel 10 with an adhesive 30. In another embodiment, the applique 18 is plastic or composite presenting a three-dimensional structure providing an appearance of depth to the applique 18 that also may be affixed to the wheel 10 with the adhesive 30. A snap or locating pin (not shown) may be included on a backside of the applique 18 to provide additional retention or assist locating the applique 18, if necessary. Alternatively, a template may be used to locate the applique 18 or backing paper or cover paper may be configured to locate the applique 18 and is subsequently removed after application. The adhesive 30 is selected for optimal adhesion to the one of the wheel substrate 12, the first intermediate polymeric coating 24, or the second intermediate polymeric coating 25, whichever is selected for desired appearance and protection of the wheel 10.

Figure 3A:
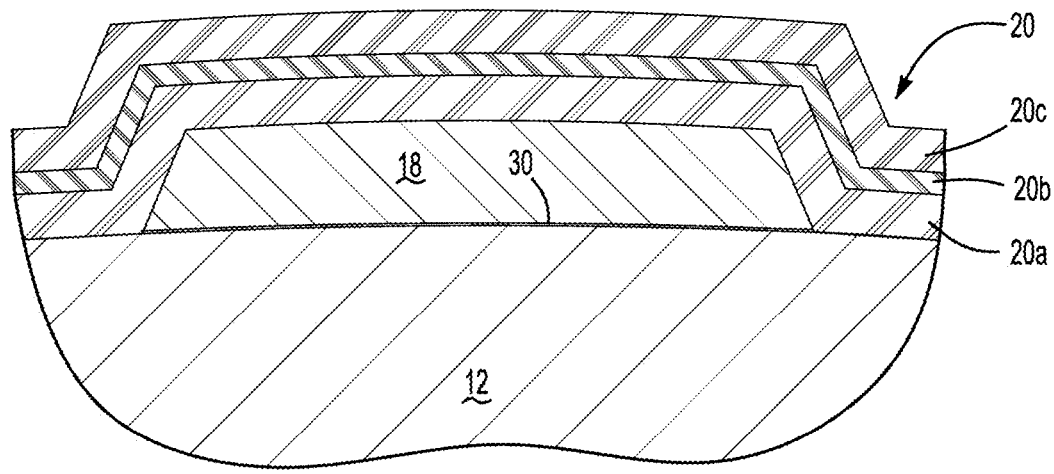
FIG. 3A shows a cross-section of a second embodiment of a wheel of the present invention.
Figure 3B:
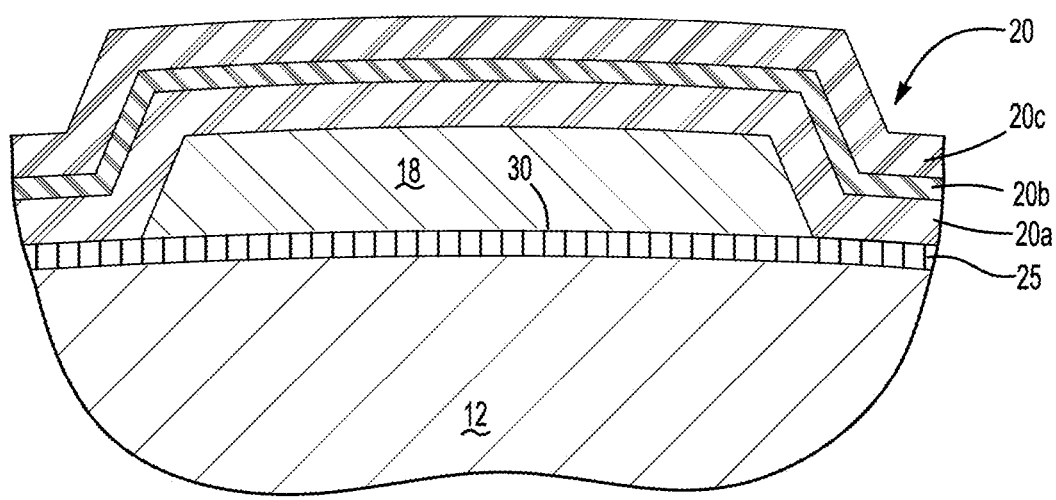
FIG. 3B shows a cross-section of the second embodiment of the wheel of the present invention with the decorative applique adhered to the second intermediate polymeric coating.

FIG. 3A shows an alternative embodiment where the applique 18 is adhered to the substrate 12 of the wheel 10 as is explained hereinabove. Prior to adhering the applique 18 to the wheel 10, the wheel 10 surface is cleaned and treated with at least one of a dry conversion coating or conventional conversion coating to improve adhesion of the applique 18 and of the polymeric over-coating 20 upon application. Alternatively, as shown in FIG. 3B, the second intermediate polymeric coating 25 may be applied over the substrate 12 of the wheel 10 prior to adhering the applique 18 to the wheel 10. Here, the second intermediate polymeric coating 25 may also be a clear, transparent coating, or may include differing levels of pigmentation, dye, or tint to achieve desired aesthetics. In this embodiment, multiple polymeric over-coatings may be implemented. As in the first embodiment, a first polymeric over-coating 20a is applied over both the applique 18 and the wheel 10 (as shown in FIG. 3A) or both the applique 18 and the second intermediate polymeric coating 25 (as shown in FIG. 3B), presenting a continuous polymeric surface. A second polymeric over-coating 20b and a third polymeric over-coating 20c are sequentially applied. Each of the polymeric coatings 20a, 20b, 20c may be a clear, transparent coating or include differing levels of pigmentation, dye or tint to achieve different aesthetics or depth to the face 13 of the wheel 10 and to the applique 18. Further, only two layers of polymeric over-coating 20a, 20b may be applied over the applique 18 and the wheel 10 to provide differing levels of environmental protection, durability, and aesthetics.

Figure 4A:
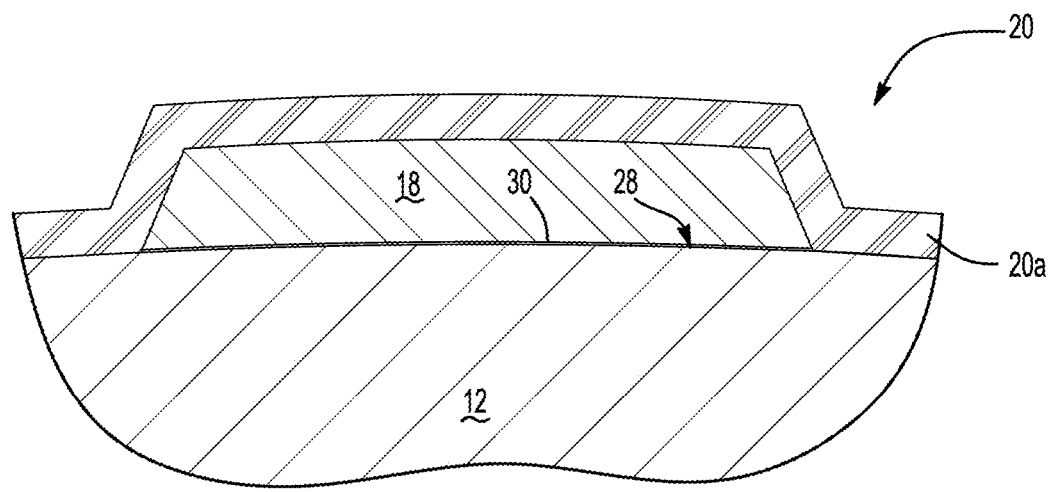
FIG. 4A shows a cross-section of a third embodiment of a wheel of the present invention.
Figure 4B:
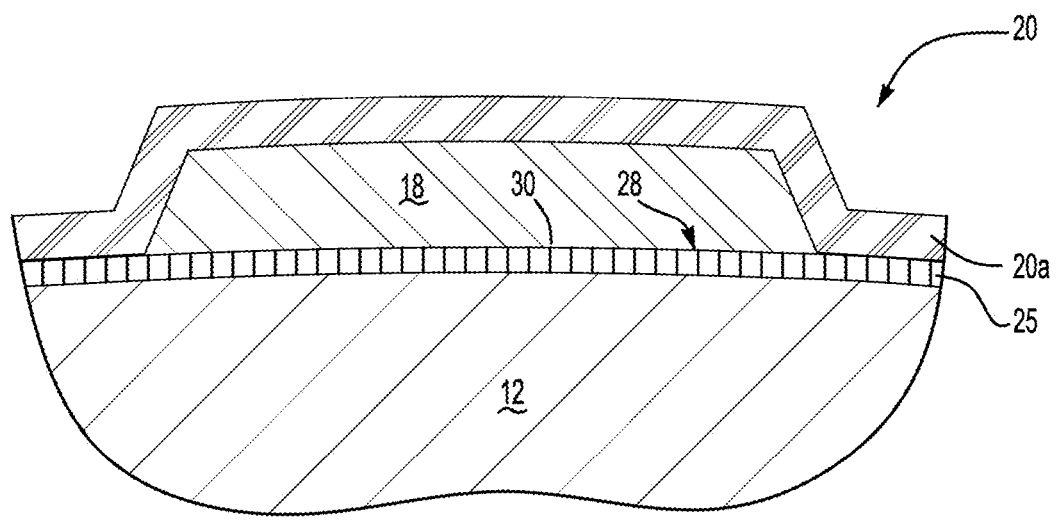
FIG. 4B shows a cross-section of the third embodiment of the wheel of the present invention with the decorative applique adhered to the second intermediate polymeric coating.

FIG. 4A shows a still further alternative embodiment where the applique 18 is adhered to the substrate 12 of the wheel 10 and only the first polymeric over-coating 20a is applied. Alternatively, as shown in FIG. 4B, the applique 18 may be adhered to the second intermediate polymeric coating 25 covering the substrate 12 of the wheel 10, and only the first polymeric over-coating 20a is applied. The first polymeric over-coating 20a again presents a continuous polymeric surface of the applique 18 and the wheel 10. In this embodiment, and in other embodiments where the applique 18 is adhered to the substrate 12 or to the second intermediate polymeric coating 25 covering the substrate 12, a previously applied polymeric coating may be mechanically removed from the wheel 10 prior to adhering the applique 18. The machined surface, in this embodiment the upper surface 28 of the face 13 (FIG. 1), is subject to cleaning and either dry conversion or conventional conversion coatings to improve adhesion of the applique 18 and the first polymeric over-coating 20a.

Figure 5A:
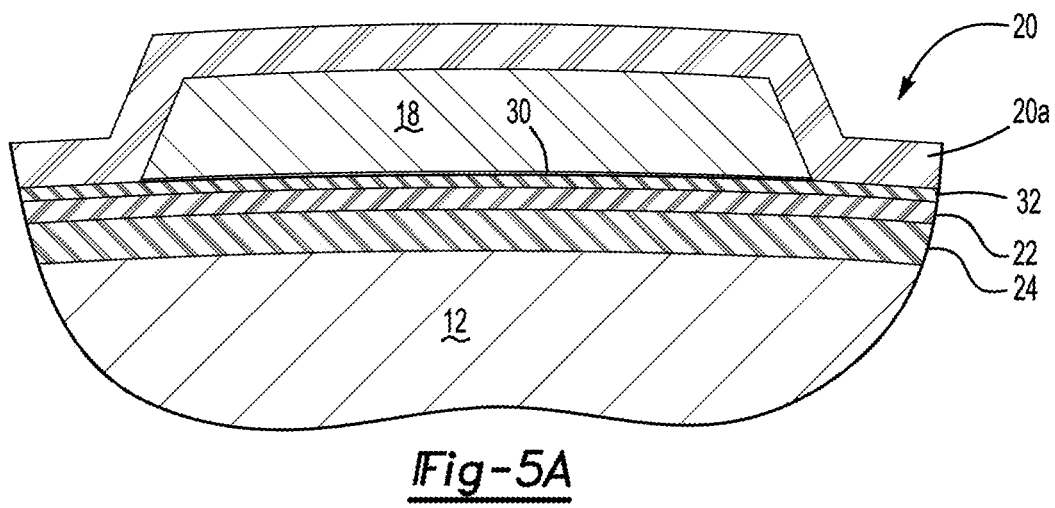
FIG. 5A shows a cross-section of a fourth embodiment of a wheel of the present invention.
Figure 5B:
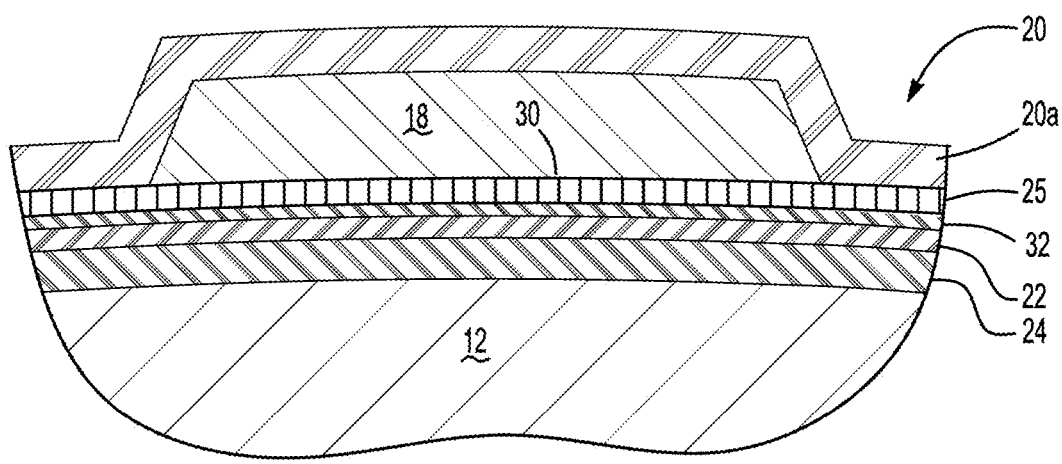
FIG. 5B shows a cross-section of the fourth embodiment of the wheel of the present invention with the decorative applique adhered to the second intermediate polymeric coating.

FIGS. 5A and 5B show a further embodiment of the invention of the present application that includes a PVD metalized layer 32. As is known to those of skill in the art, PVD is a process for physical vapor deposition of metals and metal alloys on a wheel or polymeric coating of a wheel providing a metallic appearance. Therefore, this embodiment includes the applique 18 being adhered directly to the PVD metalized layer 32 by way of the adhesive 30, as shown in FIG. 5A. As such, it may be desirable to modify the adhesive 30 used to adhere the applique 18 to the PVD metalized layer 32 from that which is used to adhere the applique 18 to a polymeric coating. Prior to applying the PVD metalized layer 32, the base polymeric coating 24 is applied to the substrate 12 of the wheel 10. The first intermediate polymeric coating 22 is applied over the base polymeric coating 24 prior to the application of the PVD metalized layer 32 to achieved desired adhesion of the PVD metalized layer to the wheel 10. Therefore, the base polymeric coating 24, the first intermediate polymeric coating 22, and the PVD metalized layer 32 are applied in sequential order between the applique 18 and the wheel substrate 12. Alternatively, as shown in FIG. 5B, the second intermediate polymeric coating 25 may be applied over the PVD metalized layer 32. The applique 18 is therefore adhered to the second intermediate polymeric coating 25 such that the base polymeric coating 24, the first intermediate polymeric coating 22, the PVD metalized layer 32, and the second intermediate polymeric coating 25 are applied in sequential order between the applique 18 and the wheel substrate 12.

FIGS. 6A and 6B show a still further embodiment that includes a modified first polymeric over-coat 20a applied over the wheel 10 and a second polymeric over-coat 20b applied over the first polymeric over-coat 20a. Therefore, the embodiment shown in FIGS. 6A and 6B is a modification of the embodiment shown in FIGS. 5A and 5B that includes two polymeric over-coats 20a, 20b to achieve additional distinguishing visual characteristics. The applique 18 is adhered via the adhesive 30 to the PVD metalized layer 32 that has been deposited over the first intermediate polymeric coating 24 and the base polymeric coating 22, as shown in FIG. 6A. Alternatively, as shown in FIG. 6B, the applique 18 may be adhered via the adhesive 30 to the second intermediate polymeric coating 25 covering the PVD metalized layer 32 that has been deposited over the first intermediate polymeric coating 24 and the base polymeric coating 22. The second polymeric over-coat 20b includes colorization by way of pigmentation or tint while maintaining translucence or transparency so that the applique 18 is visible. Alternatively, the gloss level of the second polymeric over-coat 20b is modified to a mid, low level, or matted gloss level to provide even different aesthetics. In this embodiment, the first polymeric over-coat 20a includes no additional colorization and is substantially clear to illuminate the applique 18.

Figure 7A:
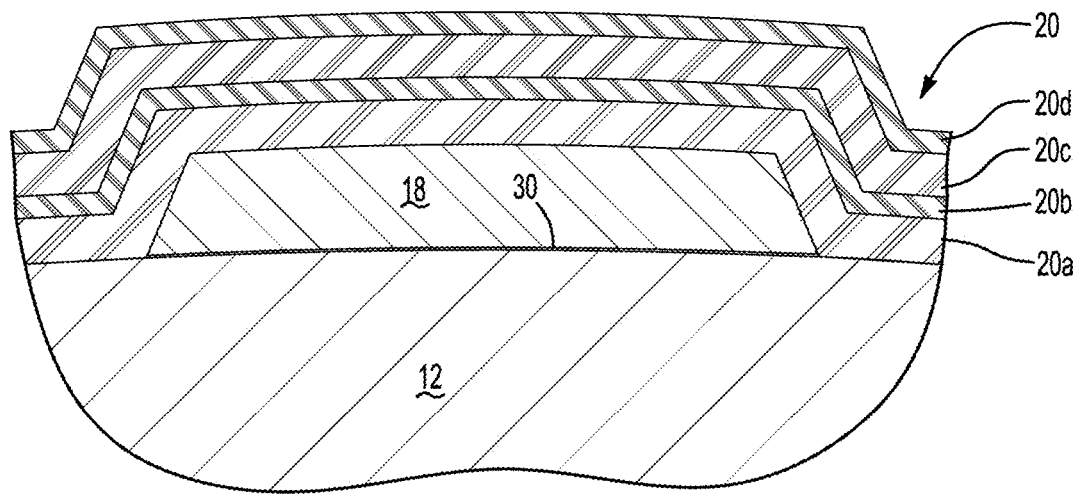
FIG. 7A shows a cross-section of a sixth embodiment of a wheel of the present invention.
Figure 7B:
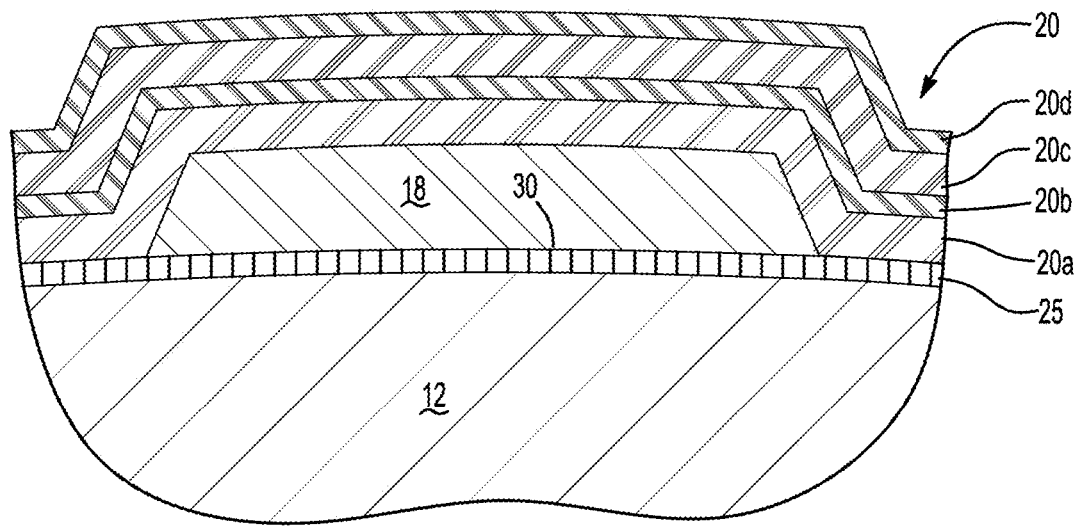
FIG. 7B shows a cross-section of the sixth embodiment of the wheel of the present invention with the decorative applique adhered to the second intermediate polymeric coating.

FIGS. 7A and 7B show a further embodiment including the third polymeric over-coat 20c and a fourth polymeric over-coat 20d that are sequentially applied prior to the first polymeric over-coat 20a and the second polymeric over-coat 20b as set forth in FIGS. 6A and 6B. The multiple layers of polymeric over-coat 20a, 20b, 20c, and 20d achieve aesthetics provided in the embodiment shown in FIGS. 6A and 6B, including variants in gloss level, translucence, and colorization as explained hereinabove. However, in this embodiment, the applique 18 is applied via the adhesive 30 directly to the wheel substrate 12, as shown in FIG. 7A. Alternatively, as shown in FIG. 7B, the applique 18 may be applied via the adhesive 30 to the second intermediate polymeric coating 25 directly covering the wheel substrate 12. The wheel substrate 12 in this embodiment may be machined to provide a "bright shiny" surface to provide an even different aesthetic to the multiple layers of polymeric over-coat 20a, 20b, 20c, and 20d while these layers also provide enhanced durability to the wheel substrate 12 and the applique 18.

Figure 8A:
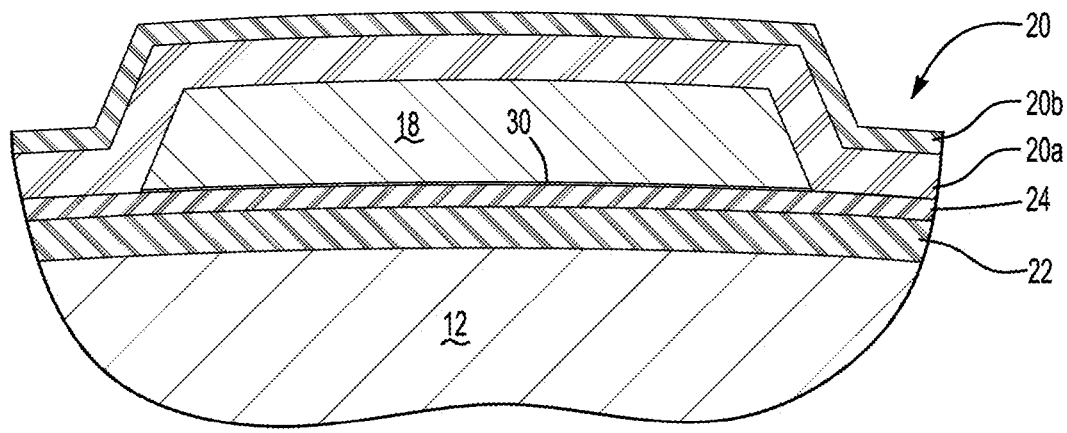
FIG. 8A shows a cross-section of a seventh embodiment of a wheel of the present invention.
Figure 8B:
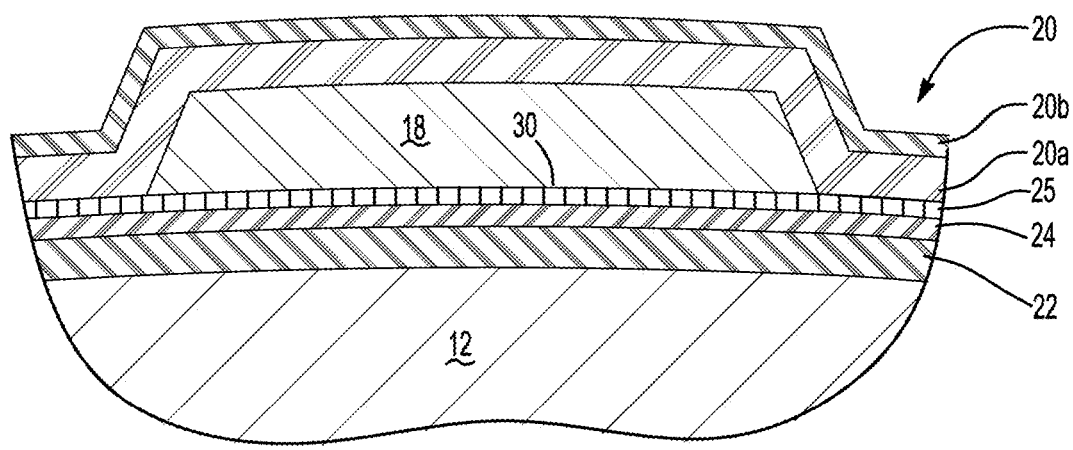
FIG. 8B shows a cross-section of the seventh embodiment of the wheel of the present invention with the decorative applique adhered to the second intermediate polymeric coating.

FIG. 8A shows a further embodiment where the applique 18 is adhered to the first intermediate polymeric coating 24. Alternatively, as shown in FIG. 8B, the applique 18 may be adhered to the second intermediate polymeric coating 25 covering the first intermediate polymeric coating 24. As in earlier embodiments, the first intermediate polymeric coating 24 is applied to the base polymeric coating 22 that is applied to the substrate 12 of the wheel 10. The first polymeric over-coating 20a is applied over the applique 18 and the first intermediate polymeric coating 24 (as shown in FIG. 8A), or alternatively, over the applique 18 and the second intermediate polymeric coating 25 (as shown in FIG. 8B). The second polymeric over-coating 20b is then applied over the first polymeric over-coating 20a. As such, the aesthetic surrounding the applique 18 when adhered to the first intermediate polymeric coating 24 is modified by the interaction between the first polymeric over-coating 20a and the first intermediate polymeric coating 24 that may be pigmented with colored pigments or metallic flake to achieve unique reflective interaction with first and second polymeric over-coatings 20a, 20b.

Figure 9A:
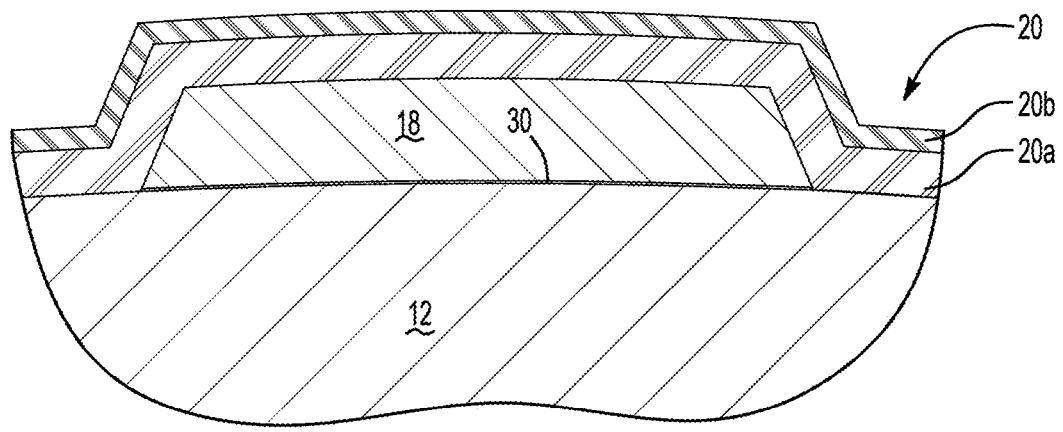
FIG. 9A shows a cross-section of an eighth embodiment of a wheel of the present invention.
Figure 9B:
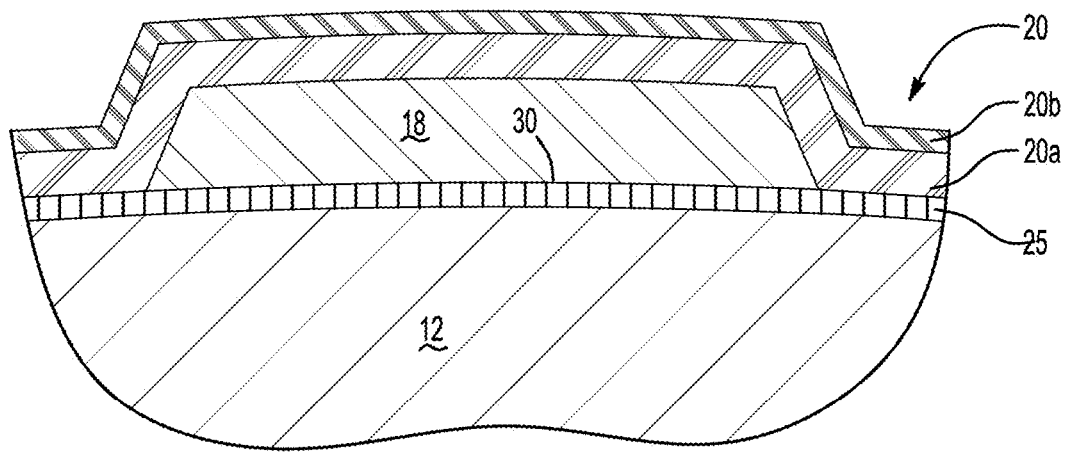
FIG. 9B shows a cross-section of the eighth embodiment of the wheel of the present invention with the decorative applique adhered to the second intermediate polymeric coating.

FIGS. 9A and 9B show a still further embodiment in which the applique 18 is applied via the adhesive 30 to the substrate 12 of the wheel 10, or alternatively, to the second intermediate polymeric coating 25 covering the substrate 12 of the wheel 10. The first polymeric over-coat 20a is applied over the applique 18, followed by application of the second polymeric over-coat 20b that may include high, mid, or low gloss level, and includes pigmentation, dye, or other colorant while allowing at least some level of transparency. Therefore, additional alternative aesthetics of the applique 18 and of the surface of the substrate 12 are further modified.

It should be apparent to those of ordinary skill in the art after reading the disclosure set forth herein that unique and distinguishing aesthetics are achievable through the applique 18 of the present invention and by modifying the sequence and types of polymeric coatings and PVD metallic layers. Applying polymeric coatings over the applique 18 to achieve a continuous and polymeric or substrate 12 of the wheel 10 provides not only unique opportunities for alternative aesthetics presenting, when desired, an appearance that the applique is part of the wheel substrate 12, but also provides uniform and improved durability to the wheel 10.

Figure 10:
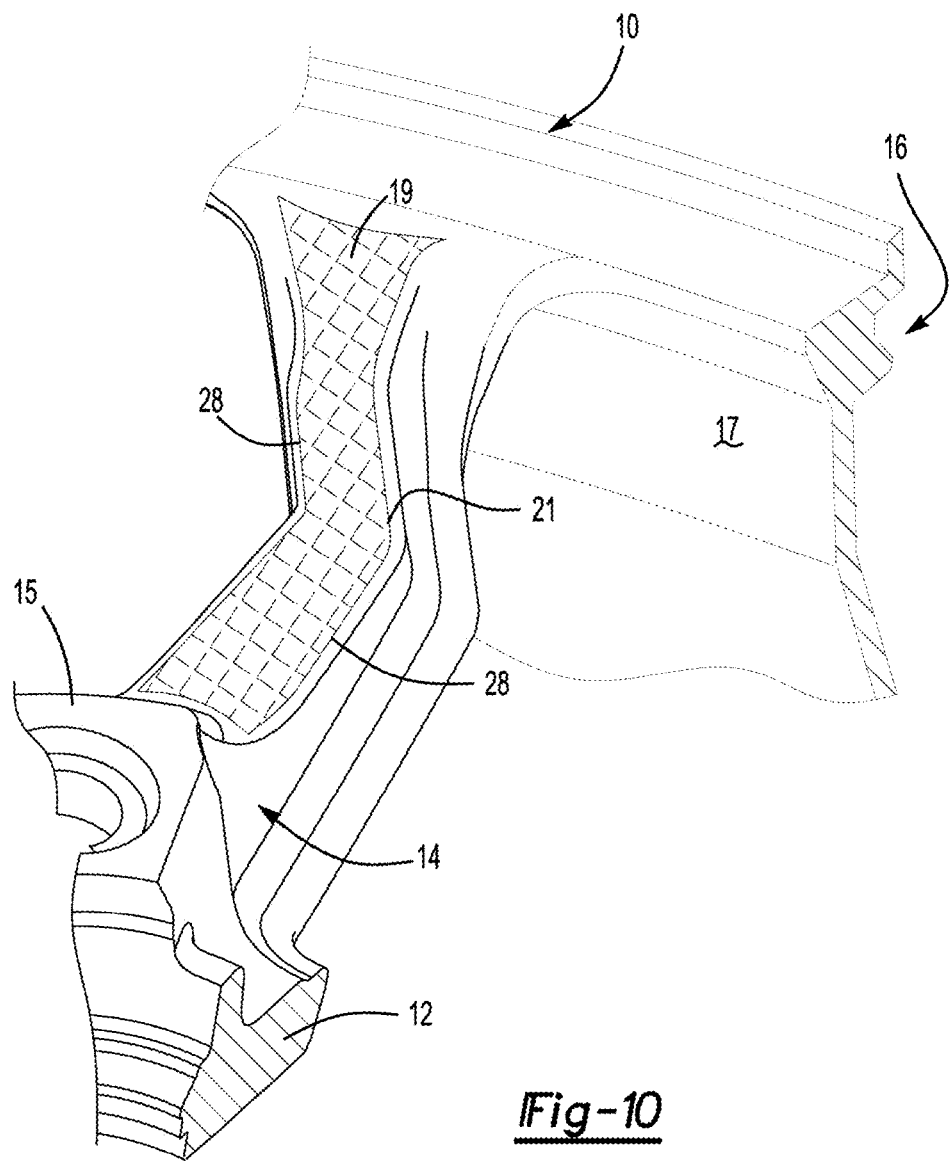
FIG. 10 shows a partial perspective view of a wheel including an alternative applique providing a textured appearance.

FIG. 10 shows an alternative applique 19 presenting a textured surface to generate depth for a unique aesthetic appearance without a need for costly machining or tooling. While shown adhered to the mating portion 21, the applique 19 can be placed on any wheel surface to achieve the unique aesthetic. Further, any type of the coating combinations shown in FIGS. 2 through 9 may be used to alter the appearance of the alternative applique 19.

Figure 13:
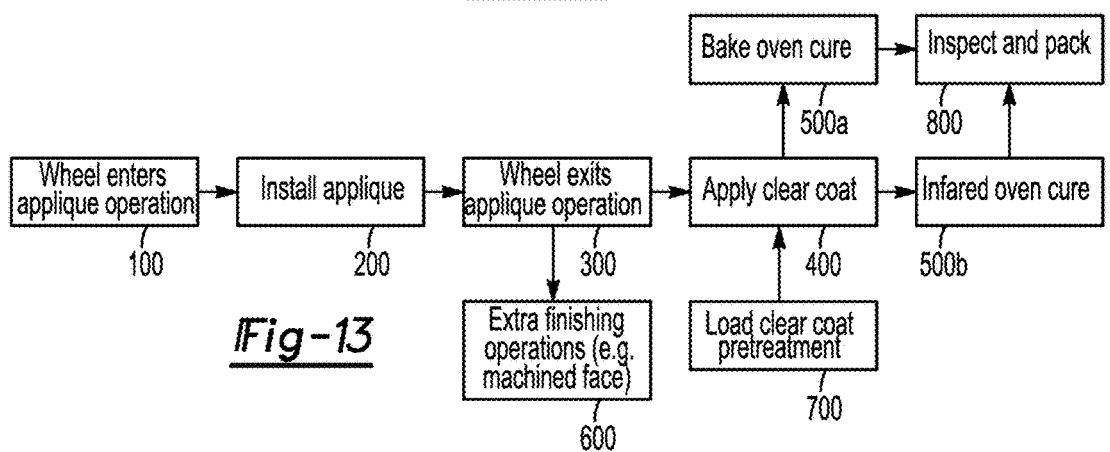
FIG. 13 shows a flow chart of a process for manufacturing a wheel including the inventive decorative applique.

Referring now to FIG. 13, a process flow diagram shows the steps of one embodiment of manufacturing the wheel of the present invention that incorporates the decorative applique 18. STEP 100, the wheel enters an applique 18 install station. STEP 200, the applique 18 is applied either to the wheel substrate 12, previously applied polymeric coatings 22, 24, 25, or PVD coating as required of the desired wheel appearance. The applique 18 is applied either manually, for low volume production, or robotically, for high volume production. STEP 300, the wheel exits the applique install station after the applique 18 has been adhered to the wheel either mechanically or by way of adhesive as described above. It should also be understood that the wheel is transferred between stations on a moving assembly line. Alternatively, the stations are modular and various methods of transfer are employed.

Following exit from the applique install station, alternative processing may take place, depending upon the desired appearance of the wheel. In one embodiment, STEP 600, the wheel is transferred to an extra processing cell where the wheel is subject to milling, machining, turning, or the like to reshape the wheel configuration or expose the substrate 12 after the applique 18 has been adhered. In this step, the applique is located in the mating portion 21 of the spoke 14 beneath the upper surface 28 to avoid being damaged during the milling or turning operation. It should be understood that while the present application discloses in detail locating the applique 18 on a spoke 14, the applique 18 could be located anywhere on the face 13 of the wheel, including but not limited to the central portion 15. Further, the applique 18 could also be located on the bead 17 defined by the rim portion 16. Following STEP 600, the wheel necessarily requires cleaning and application of a conversion coating, which is achieved in a pretreatment cell identified in STEP 700. Following the pretreatment cell, the wheel is transferred again to the clear polymeric over-coat cell identified as STEP 400 in FIG. 13.

In an alternative embodiment, following applique application performed in STEP 300, the wheel is immediately transferred to the clear polymer coating cell identified as STEP 400. In both embodiments, the clear polymeric over-coat 20, as explained above, may include liquid or powder compositions or be formulated for infrared or heated curing. If the clear polymer coating requires heat curing, the wheel is transferred to a bake oven identified as STEP 500*a*. If the clear polymer coating requires infrared curing, the wheel is transferred to an infrared curing cell identified as STEP 500*b*. After curing, the wheel is inspected and packed for shipping at STEP 800. It should be understood that the assembly process is completely flexible and adapted to have both heat curing and infrared curing on the same assembly line by making use of various transfer conveyor technologies. It should also be understood that the process steps could include a PVD metal application step in which the applique 18 is either adhered to the PVD metal, or the PVD metal coating is covered with a clear polymeric coating and the applique is adhered to the clear polymeric coating.

Obviously, many modifications and variations of the present invention are possible in light of the above teachings. The foregoing invention has been described in accordance with the relevant legal standards; thus, the description is merely exemplary than limiting in nature. Variations and modifications to the disclosed embodiment may become apparent to those skilled in the art and do come within the scope of this invention. Accordingly, the scope of a legal protection afforded this invention can only be determined by studying the following claims.

What is claimed is:

1. A method of decorating a vehicle wheel, comprising the steps of:
   forming a vehicle wheel having an alloy substrate;
   providing an applique including a decorative feature and adhering said applique to said vehicle wheel;
   after adhering said applique to said vehicle wheel applying a first transparent polymeric coating over said applique and over a face of said vehicle wheel thereby forming a continuous polymeric surface extending over said applique and over said face of said vehicle wheel.

2. The method set forth in claim 1, wherein said step of applying a first transparent polymeric coating is further defined by presenting a same gloss level over said applique and said wheel.

3. The method set forth in claim 1, wherein said step of applying a first transparent polymeric coating is further defined by said transparent polymeric coating being tinted.

4. The method set forth in claim 1, further including a step of applying a primer polymeric coating over said alloy substrate prior to adhering said applique to said wheel, thereby adhering said applique to said primer polymeric coating.

5. The method set forth in claim 4, further including a step of removing said primer polymeric coating from said alloy substrate of said wheel and adhering said applique to said alloy substrate.

6. The method set forth in claim 4, further including a step of applying an intermediate polymeric coating over said primer polymeric coating prior to adhering said applique to said wheel, thereby adhering said applique to said intermediate polymeric coating.

7. The method set forth in claim 1, further including a step of applying a protective polymeric coating over said alloy substrate prior to adhering said applique to said wheel, thereby adhering said applique to said protective polymeric coating.

8. The method set forth in claim 4, further including a step of applying a protective polymeric coating over an intermediate polymeric coating prior to adhering said applique to said wheel, thereby adhering said applique to said protective polymeric coating.

9. The method set forth in claim 6, further including a step of applying a second transparent polymeric coating over said first polymeric coating.

10. The method set forth in claim 9, wherein said step of applying a second transparent polymeric coating over said first polymeric coating is further defined by coloring said second transparent polymeric coating.

11. The method set forth in claim 1, further including a step of applying a metallic layer over a primer polymeric coating prior to adhering said applique to said wheel.

12. The method set forth in claim 11, further including a step of applying a protective polymeric coating over said metallic layer prior to adhering said applique to said wheel, thereby adhering said applique to said protective polymeric coating.

13. The method set forth in claim 1, wherein said step of applying an applique to said wheel is further defined by applying a three-dimensional applique to said wheel.

14. The method set forth in claim 1, further including a step of providing co-operable locating features on at least one of said wheel and said applique for locating said applique on said wheel.

15. The method set forth in claim 9, wherein said step of applying a second polymeric coating is further defined by applying a second polymeric coating being at least one of tinted, pigmented, low gloss level, and mid gloss level.

16. A vehicle wheel, comprising:
   a wheel defined by a wheel substrate including a face and a rim portion, said face defining a plurality of spokes extending radially outwardly between a central portion of said face and said rim portion;
   said wheel defining a mating portion;
   an applique affixed to said wheel at said mating portion;
   a polymeric over-coating being substantially transparent and extending over said applique and a face of said wheel thereby defining a continuous polymer surface extending over said applique and said face of said wheel.

17. The vehicle wheel set forth in claim 16, wherein said polymeric over-coating provides a same gloss level over said applique and said wheel substrate.

18. The vehicle wheel set forth in claim 16, wherein said polymeric over-coating includes coloring.

19. The vehicle wheel set forth in claim 16, wherein said polymeric over-coating includes a plurality of polymeric layers.

20. The vehicle wheel set forth in claim 16, further including a primer polymeric coating disposed on said wheel substrate beneath at least one of said applique and said polymeric over-coating.

21. The vehicle wheel set forth in claim 20, further including an intermediate coating disposed between said primer polymeric coating beneath at least one of said applique and said polymeric over-coating.

22. The vehicle wheel set forth in claim 21, further including a protective polymeric coating disposed between said intermediate coating beneath at least one of said applique and said polymeric over-coating.

23. The vehicle wheel set forth in claim 16, further including a protective polymeric coating disposed on said wheel substrate beneath at least one of said applique and said polymeric over-coating.

24. The vehicle wheel set forth in claim 20, further including a metal layer disposed between said primer polymeric layer and said at least one of said applique and said polymer over-coating.

25. The vehicle wheel set forth in claim 24, further including a protective polymeric coating disposed between said metal layer and at least one of said applique and said polymer over-coating.

26. The vehicle wheel set forth in claim 20, wherein said wheel substrate is visible through said polymer over-coating.

27. The vehicle wheel set forth in claim 16, wherein said applique is three dimensional.

28. The vehicle wheel set forth in claim 16, wherein said applique is two dimensional.

* * * * *